United States Patent

Burleigh et al.

[11] Patent Number: 5,487,588
[45] Date of Patent: Jan. 30, 1996

[54] CHILD SAFETY SEAT

[75] Inventors: David W. Burleigh, Bognor Regis, England; Waldemar Czernakowski, Blaustein; Hermann Wetter, Ulm, both of Germany

[73] Assignees: Britax-Excelsior Limited, England; Britax Romer Kindersicherheit GmbH, Germany

[21] Appl. No.: 215,808

[22] Filed: Mar. 22, 1994

[30]     Foreign Application Priority Data

Apr. 8, 1993 [GB] United Kingdom ............... 9307446

[51] Int. Cl.⁶ .......................................... B60N 2/28
[52] U.S. Cl. ................. 297/253; 297/256.14; 297/250.1
[58] Field of Search ................... 297/250.1, 252, 297/253, 256.1, 256.14, 216.11, 216.1, 256.17, 130, 118, 68; 296/63, 64; 280/801.1

[56]              References Cited

U.S. PATENT DOCUMENTS

| | | | |
|---|---|---|---|
| 2,848,036 | 8/1958 | Campbell | 297/253 |
| 3,127,652 | 4/1964 | Springer | 297/468 X |
| 3,922,035 | 11/1975 | Wener | 297/253 X |
| 4,312,539 | 1/1982 | Takada | 297/468 |
| 4,500,133 | 2/1985 | Nakao et al. | 297/464 X |
| 4,768,828 | 9/1988 | Kohketsu | 297/250.1 |
| 4,913,490 | 4/1990 | Takahashi et al. | 297/256.14 |
| 4,958,887 | 9/1990 | Meeker | 297/256.17 |

FOREIGN PATENT DOCUMENTS

| | | | |
|---|---|---|---|
| 2354898 | 1/1978 | France | 297/250.1 |
| 7515104 | 6/1976 | Netherlands | 297/216.11 |

*Primary Examiner*—Milton Nelson, Jr.
*Attorney, Agent, or Firm*—Davis, Bujold & Streck

[57]              ABSTRACT

A child safety seat for use in a vehicle comprises a seat body having a seat portion and a backrest portion. In order to connect the seat body to a motor vehicle, a pair of attachment buckles are mounted by rigid links on opposite sides of the seat body for movement between first and second positions. In the first position, the buckles project rearwardly so as to be engageable with two anchorage units which are rigidly fixed to the vehicle body so as to be accessible between the seat portion and the backrest portion of the vehicle seat. In the second position, the buckles provide support for guides for an adult seat belt.

18 Claims, 7 Drawing Sheets

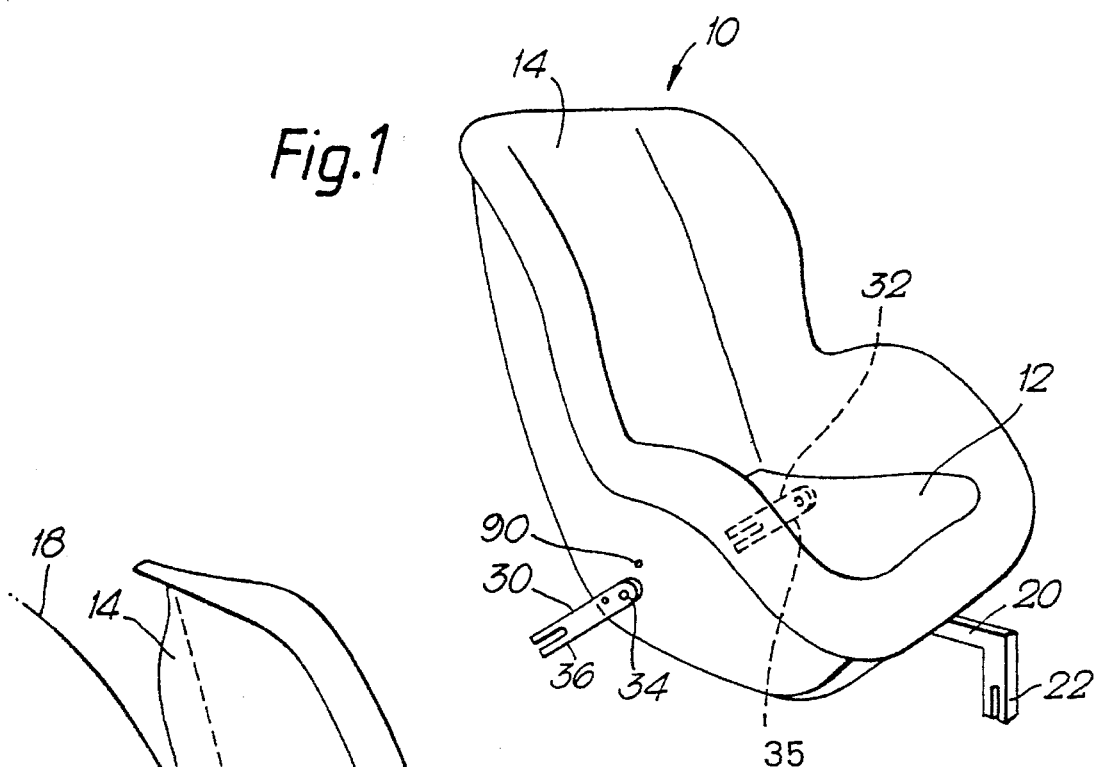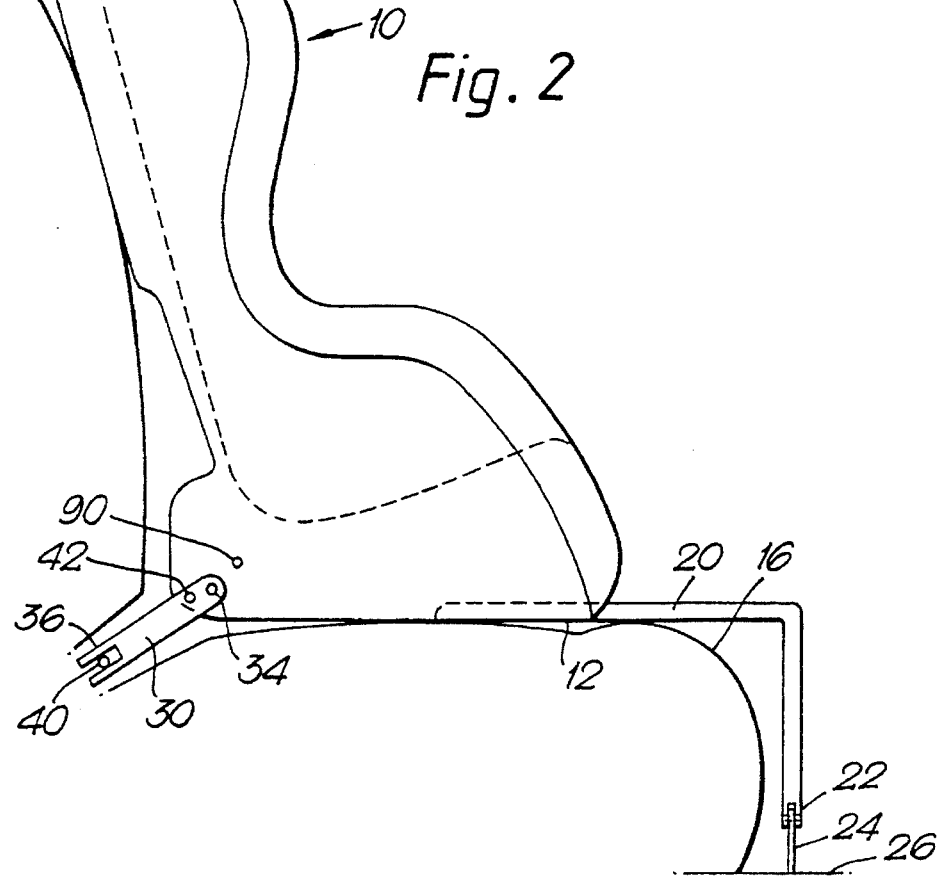

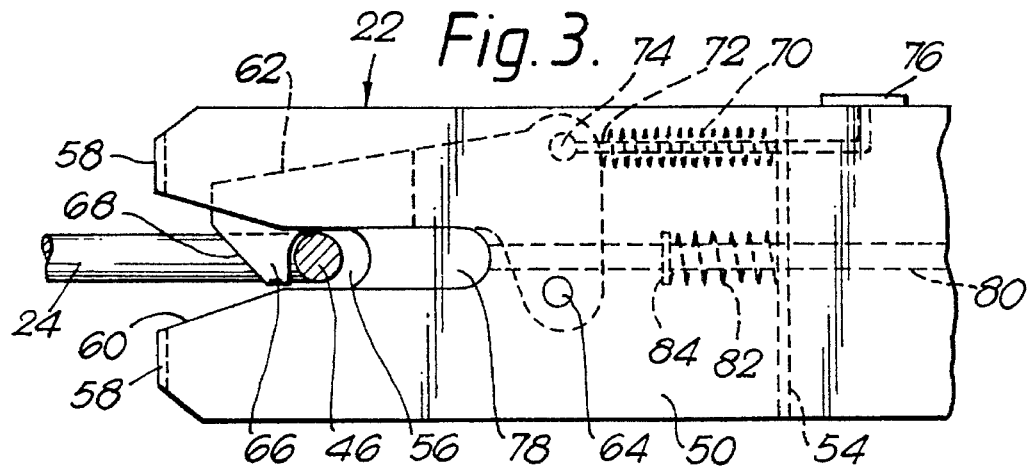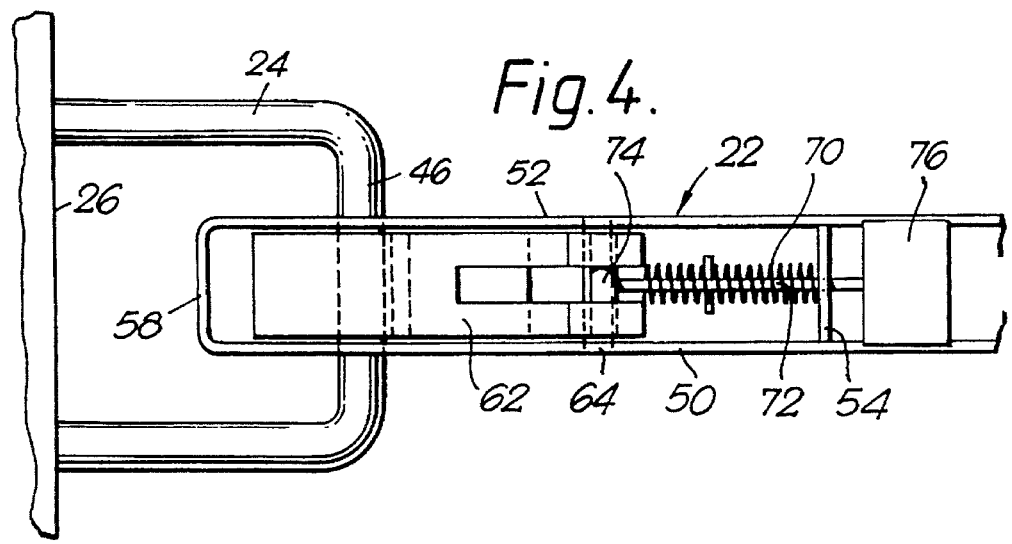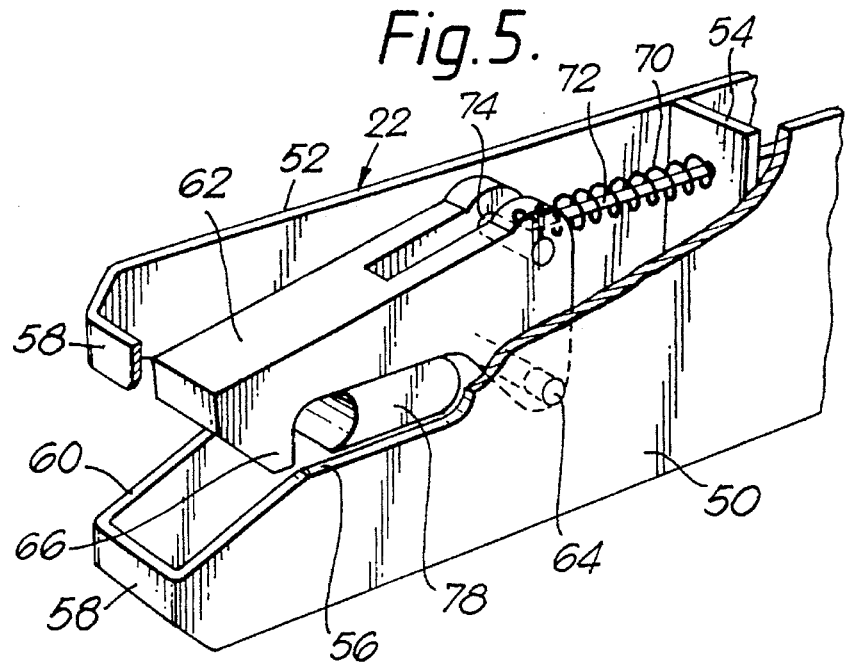

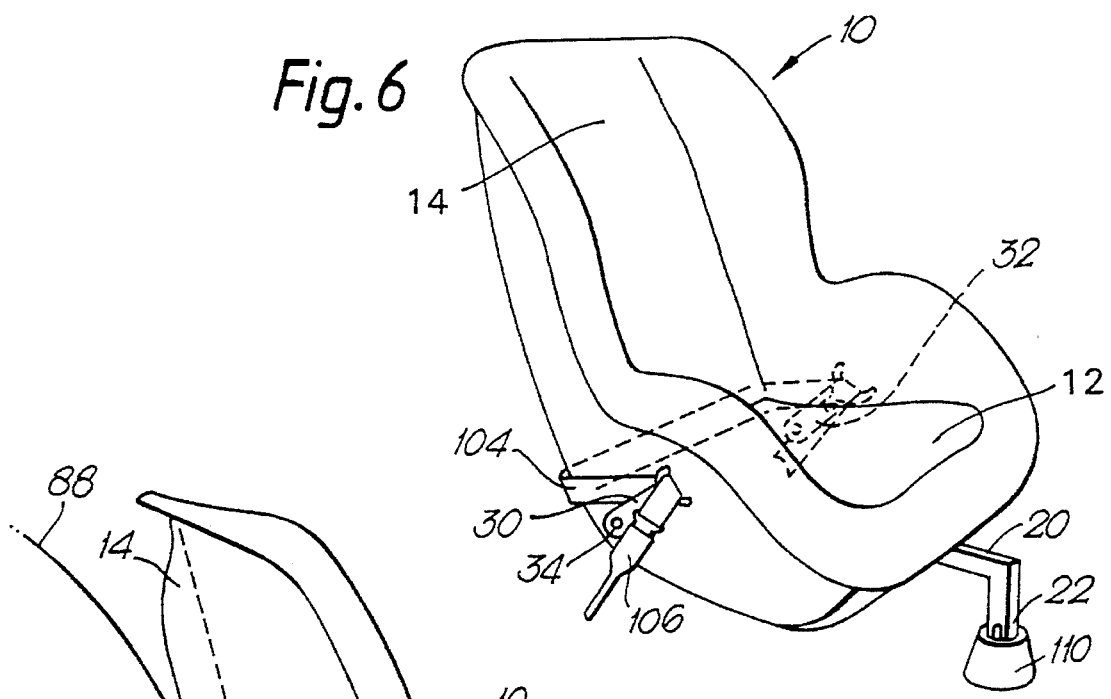
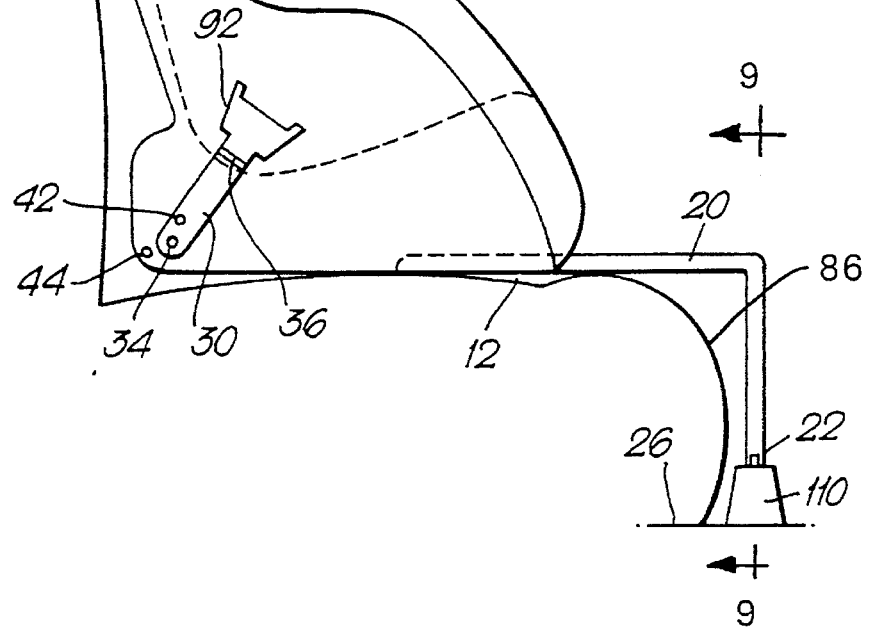

5,487,588

CHILD SAFETY SEAT

FIELD

This invention relates to a child safety seat for use in a vehicle of the type comprising a seat body having a seat portion and a backrest portion, and releasable coupling means for connecting the seat body to a motor vehicle.

RELATED ART

It is well known for the coupling means of a seat of this type to comprise an adult seat belt, the child seat resting on the corresponding vehicle seat The disadvantage of this arrangement is that, even if the adult belt is pulled very tight during installation, the resilience of both the vehicle seat and the belt will permit undesirable movement of the child seat relative to the vehicle in the event of sudden deceleration, for example during an accident. In order to overcome this disadvantage, it has been proposed to provide motor cars with anchorage units which are rigidly secured to the vehicle body at agreed locations for engagement by releasable connectors which are rigidly coupled to a child's seat. Such anchorage units will be referred to hereinafter as "standard anchorage units". The present invention is concerned with the provision of a child's seat which can be used with both of the foregoing mounting arrangements.

SUMMARY OF THE INVENTION

According to the invention, the releasable coupling means comprises a pair of attachment buckles mounted by means of rigid links on opposite sides of the seat body for movement between a first position in which they project rearwardly so as to be engageable with two standard anchorage units which are accessible between the seat portion and the backrest portion of the vehicle seat and a second position in which they provide support for guide means for an adult seat belt.

This arrangement has the advantage that the same load-bearing attachments to the seat body are used both when the seat is attached to standard anchorage units in a vehicle and when it is secured to the vehicle using an adult seat belt.

Preferably, releasable means are provided for securing each of the attachment buckles either in its first position or in its second position.

The guide means for adult seat belt may be integral with the attachment buckles. Alternatively the guide means may comprise a respective detachable guide unit for each attachment buckle adapted to be engaged by the latching mechanism thereof.

In one form of the invention, the final stage of the movement of the attachment buckles into their second position is arranged to apply additional tension to the adult seat belt if it is fastened before such final stage of movement is completed.

Preferably, the child's seat is provided with a third attachment buckle mounted on a projection extending forwardly and downwardly so as to be engageable with a third standard anchorage unit disposed adjacent to the front edge of the seat portion and below the top surface thereof even when the seat cushion is compressed to its maximum extent.

BRIEF DESCRIPTION OF THE DRAWINGS

FIG. 1 is a perspective view of a forward facing child's safety seat in accordance with the invention with its attachment buckles oriented to engage with standard anchorage units;

FIG. 2 is a side view showing the seat of FIG. 1 mounted of the vehicle seat using standard anchorage units;

FIG. 3 is a side view of one of the attachment buckles of the seat shown in FIGS. 1 and 2 engaged with an anchorage unit which is secured to a vehicle;

FIG. 4 is a front view of the attachment buckle shown in FIG. 3

FIG. 5 is a partially broken away perspective view of the attachment buckle shown in FIGS. 3 and 4;

FIG. 6 is a perspective view of the seat shown in FIG. 1 with its attachment buckles in the orientation for use within adult seat belt;

FIG. 7 is a side view, similar to FIG. 2 but with its attachment buckles in the orientation shown in FIG. 6 and with the adult seat belt omitted;

DETAILED DESCRIPTION OF THE PREFERRED EMBODIMENT

Figure 8:
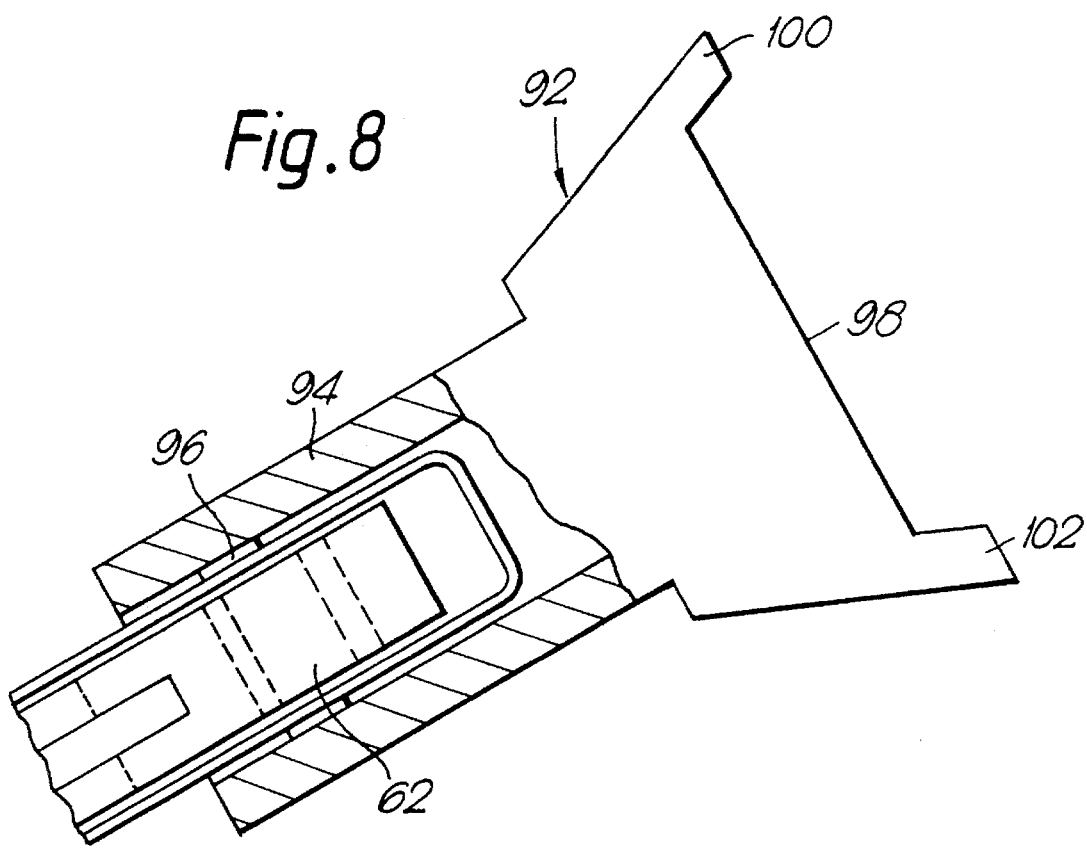
FIG. 8 is a partially broken-away side view of a belt guide fitted to one of the rear attachment buckles of the seat shown in FIG. 6.

Referring to FIGS. 1 and 2, a child seat 10 comprises a shell having a seat portion 12 and a backrest portion 14. The seat 10 is fitted with a conventional harness (not shown) for a child occupant.

In use, the seat 10 is positioned on a vehicle seat with its seat portion 12 resting on the seat portion 16 of the adult seat and its backrest 14 resting against the backrest 18 of the adult seat. The seat 10 has a forwardly projecting L-shaped leg 20 which is rigidly secured to the underside of the seat portion 12 and has an attachment buckle 22 on its free end. FIG. 2 shows the buckle 22 in engagement with a front anchorage unit 24 secured to the floor 26 of the vehicle closely adjacent to the front edge of the seat portion 16 of the adult seat.

The seat 10 also has a pair of buckle links 30 and 32, each of which is mounted by a respective pivot pin 34, 35 on a respective side of the seat 10 adjacent to the junction between the seat portion 12 and the backrest 14 thereof. Each of the buckle links 30 and 32 carries a buckle 36 on its free end. Each of the buckles 36 engages with a respective rear anchorage unit 40 which is accessible between the seat portion 16 and the backrest 18 of the adult seat. The buckle link 30 is secured in the orientation shown in FIGS. 1 and 2 by a screw 42 which engages in a tapped hole 44 (visible in FIG. 7). A similar screw (not shown) secures the other buckle link 32 in the orientation illustrated.

FIGS. 3 to 5 illustrate the buckle 22 and the front anchorage unit 24 in more detail. The anchorage unit 24 consists of a U-shaped rod-like member secured to the vehicle floor 26 by the ends of its limbs with its central portion 46 oriented in a generally horizontal direction transversely of the vehicle.

The buckle 22 has a main body formed from sheet metal bent into a U-shape so as to provide two mutually parallel side walls 50 and 52 having a transverse wall 54 extending therebetween. The ends of the side walls 50 and 52 to the right of the wall 54, as viewed in the drawings, are connected to the leg 20 (not shown in FIGS. 3 to 5).

Each of the side walls 50 and 52 has an open-ended slot 56 extending through an end wall 58 formed by the portion of the U-shaped body interconnecting the two side walls 50 and 52. Each slot 56 has a flared outer end 60. In use, the transverse part 46 of the corresponding anchorage unit 24 is received in the slots 56, the flared outer part 60 assisting achievement of the correct alignment during insertion.

A latch member 62 is mounted on a pivot pin 64 which extends between the side walls 50 and 52. The latch member 122 has a hook formation 66 which engages round the transverse part 46 of the anchorage unit 24. A cam surface 68 on the outer end hook part 66 displaces the hook part 66 out of the path of the transverse portion 46 during insertion.

The latch member 62 is biassed into its engaged position by a compression spring 70 which engages with the transverse wall 54. An L-shaped link 72 extends through the compression spring 70 and has one end connected to a transverse pin 74 on the latch member 62 and the other to a manually operable slider 76, movement of which causes the latch member 62 to disengage.

An ejector 78 is mounted in the slots 56 in the side walls 52 and 54 and has a stem 80 projecting through the transverse wall 54. A compression spring 82, engages between the wall 54 and a flange 84 on the stem 80 so as to bias the ejector 78 outwardly. This ensures that the ejector 78 remains closely in abutment with the transverse part 46 of the anchorage unit 24 when the buckle is fastened (although for clarity of illustration it is shown spaced apart therefrom in FIG. 3). The ejector 78 serves to ensure that, when the latch 62 is released, the transverse part 46 is moved outwardly at least as far as the ramp part 68 of the hook 66.

The buckles 36 on the buckle links 30 and 32 are substantially identical to the buckle 22 on the leg 20. The two rear anchorage units 40 are similar to the front anchorage 24.

When it is desired to install the seat 10 on a vehicle seat, having a seat portion 86 and a backrest 88, which is not equipped with anchorage units such as the anchorage units 24 and 40, the screw 42 is removed and the buckle link 30 pivoted to the orientation shown in FIGS. 6 and 7. The buckle link 30 is then secured in this orientation by engagement of the screw 42 in a tapped hole 90 (visible in FIGS. 1 and 2). The buckle link 32 is moved to the orientation shown in FIGS. 6 and 7, and secured there, in a similar manner.

Referring to FIG. 8, a respective belt guide 92 is secured to the free end of each of the buckle links 30 and 32 by its respective buckle 36. Each belt guide 92 comprises a socket portion 94 for receiving the buckle 36. A pin 96 extends across the socket portion 94 for engagement by the latch 62 of the buckle 36 in a similar manner to the transverse portion 46 of the anchorage unit 24 described above. The belt guide 92 also has a guide surface 98 with projections 100 and 102 at its ends, between which an adult lap belt 104 is received, as shown in FIG. 6. Although the lap belt 104 passes behind the seat back 88, its end portions are held clear of the vehicle seat 86, 88 by a sufficient distance to leave room for an adult seat belt buckle 106.

Figure 9:
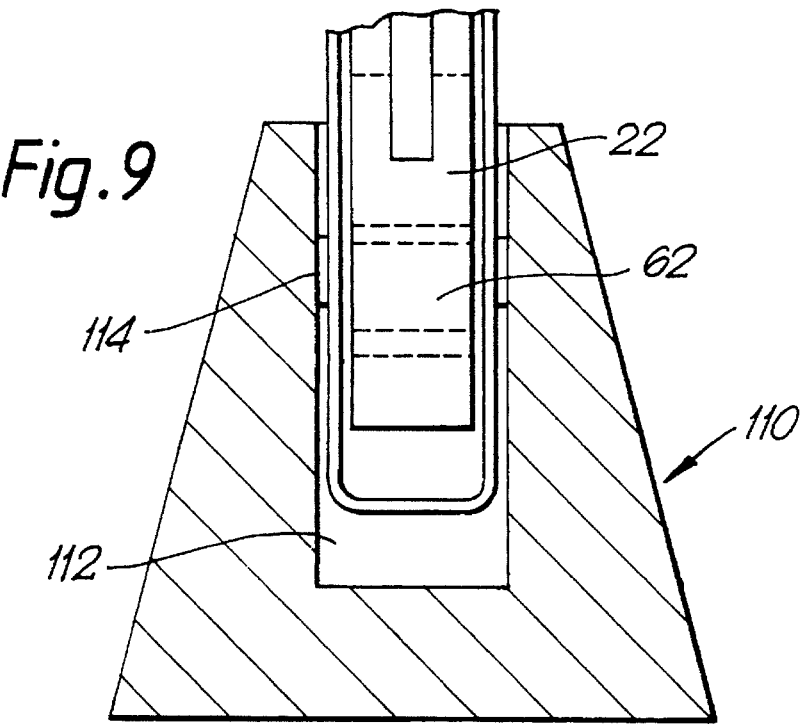
FIG. 9 is a cross-sectional view taken on the line 9—9 in FIG. 7.

FIG. 9 shows a foot 110 which rests on the floor 26 of the vehicle and is attached to the free end of the leg 20 by its buckle 22. The foot 110 has a socket 112 for receiving the buckle 22. A pin 114 extends across the socket 112 for engagement by the latch 62 of the buckle 22.

Figure 10:
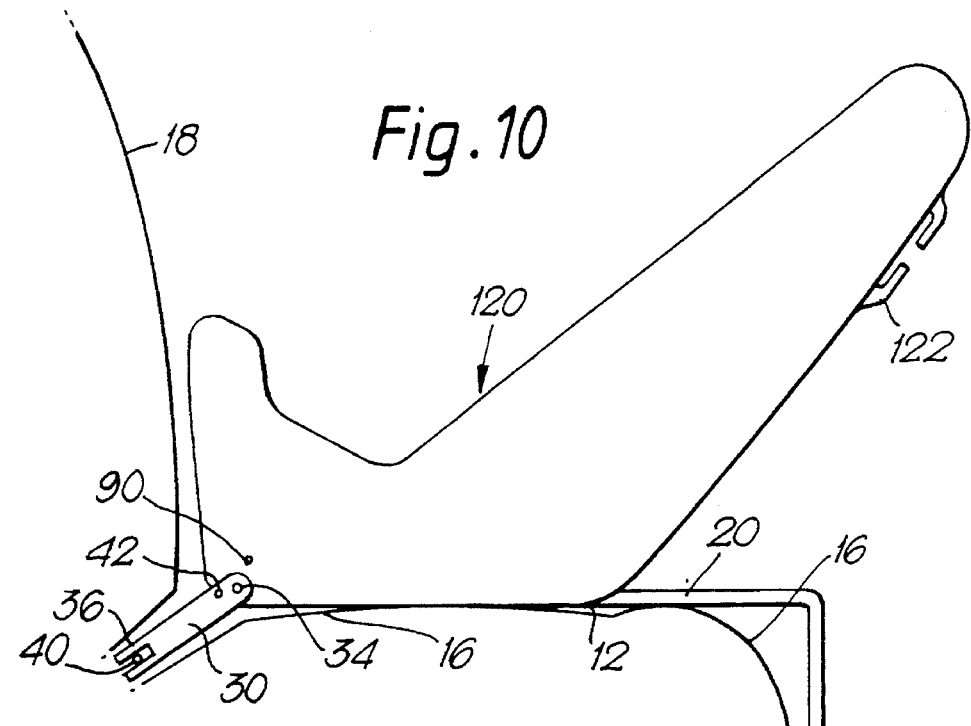
FIG. 10 and 11 are side views, corresponding respectively to FIGS. 2 and 7, of a rearward facing child's safety in accordance with the invention.
Figure 11:
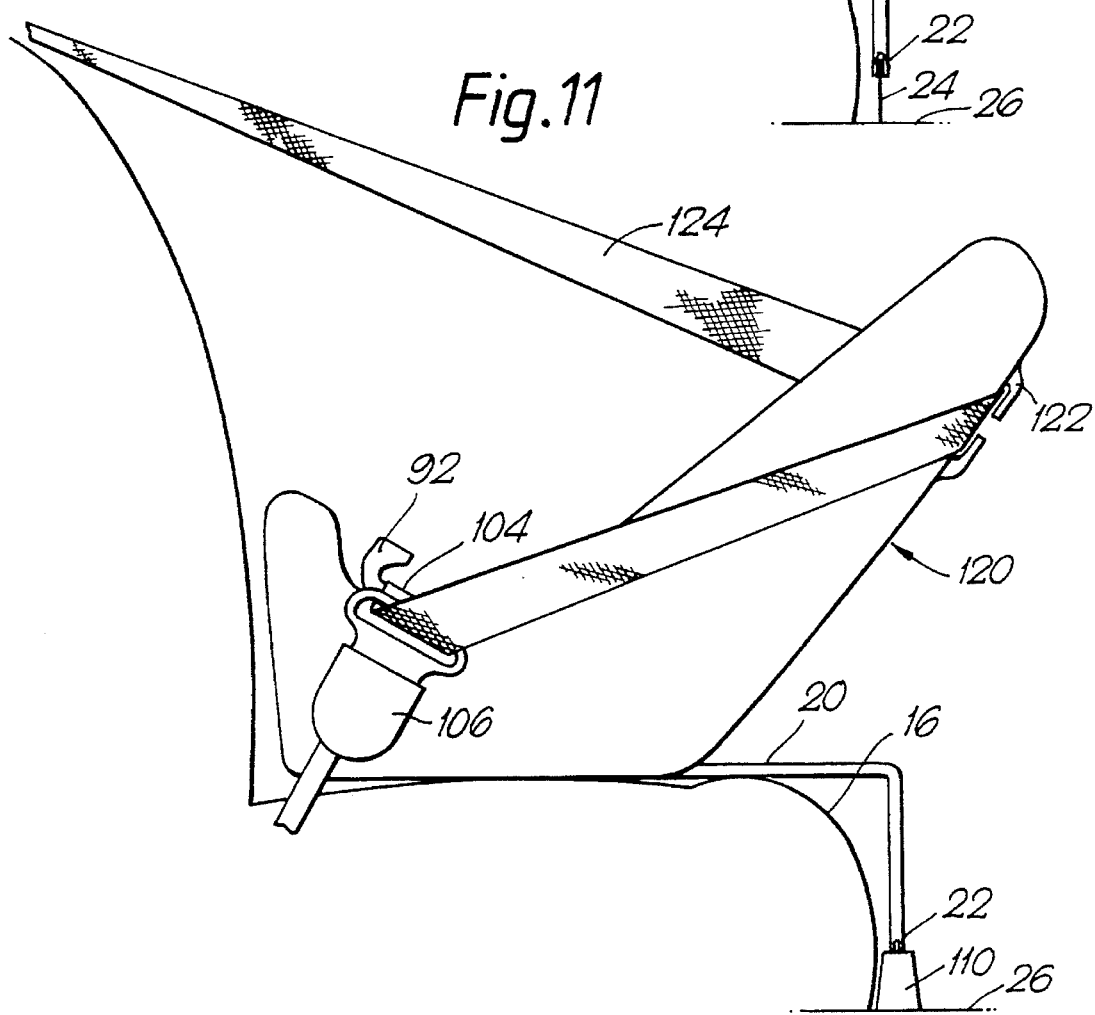

FIG. 10 shows a rearward facing child's seat having a seat 120 with a forwardly projecting L-shaped leg 20 which has an attachment buckle 22 on its free end, and a pair of buckle links 30, mounted by pivot pins 34 on respective sides of the seat 120 and carrying attachment buckles 36 on their free end. The seat 120 is attached by its buckles 22 and 36 to standard anchorage units 24 and 40 in a similar manner to the seat 10 of FIG. 2. The seat 120 has an additional belt guide 122 on the outer (forward facing) side of its backrest portion. When the seat 120 is secured in a vehicle using an adult seat belt, in a similar manner to that described with reference to FIGS. 6 and 7, each of the rear buckles 36 is fitted with a respective belt guide 92 and a foot 110 is attached to the buckle 22. The lap portion 104 of the adult belt is positioned as described above with reference to FIG. 7, while the shoulder portion 124 is lead through the additional belt guide 122. Other parts of the seat 120 shown in FIGS. 10 and 11 are denoted with the same reference numerals as corresponding parts of the seat 10 of FIGS. 1 to 9.

Figure 12:
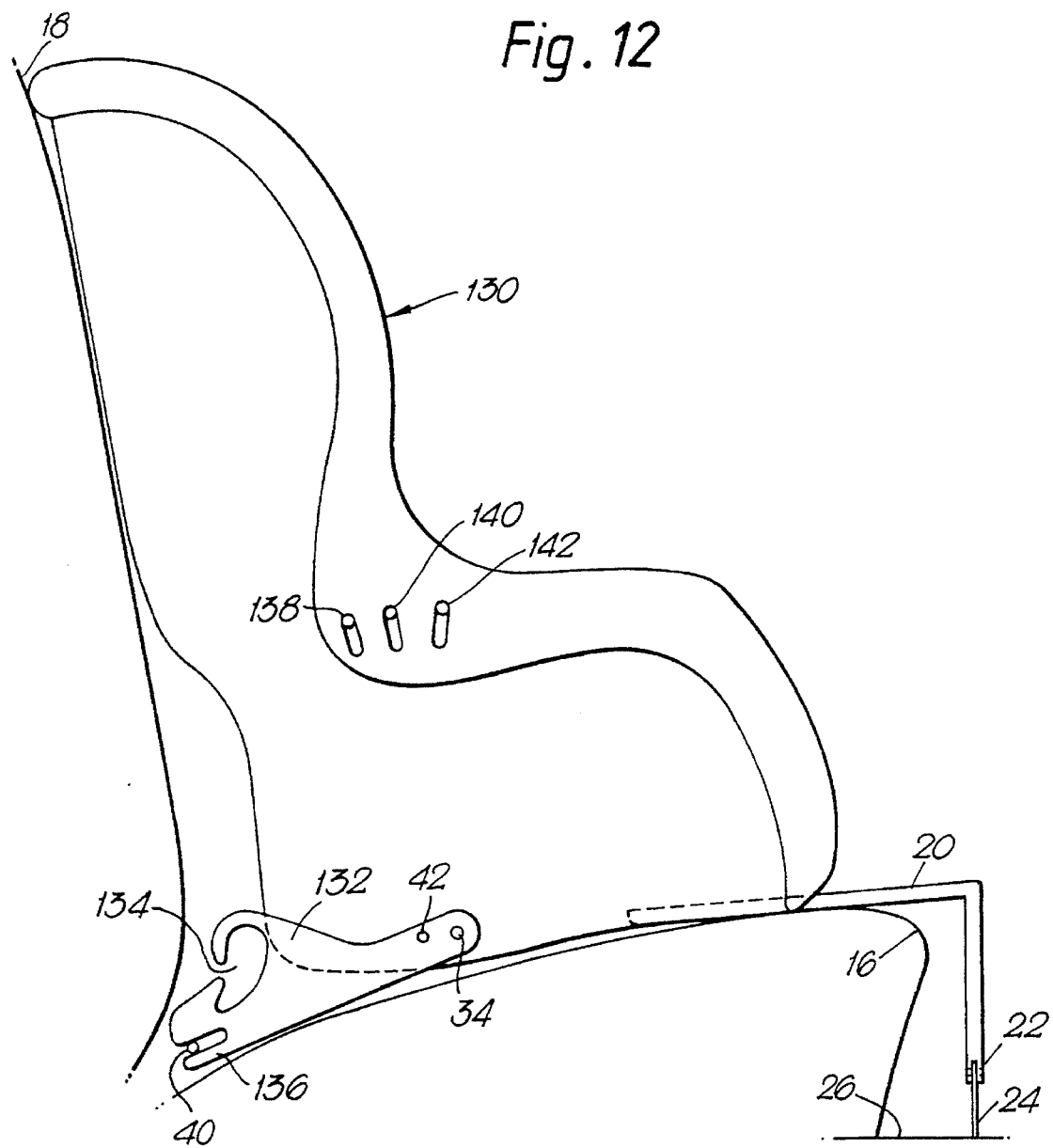
FIG. 12 and 13 are side views, corresponding respectively to FIGS. 2 and 7, of a forward facing child's safety seat in accordance with the invention, with attachment buckles having integral belt guides.
Figure 13:
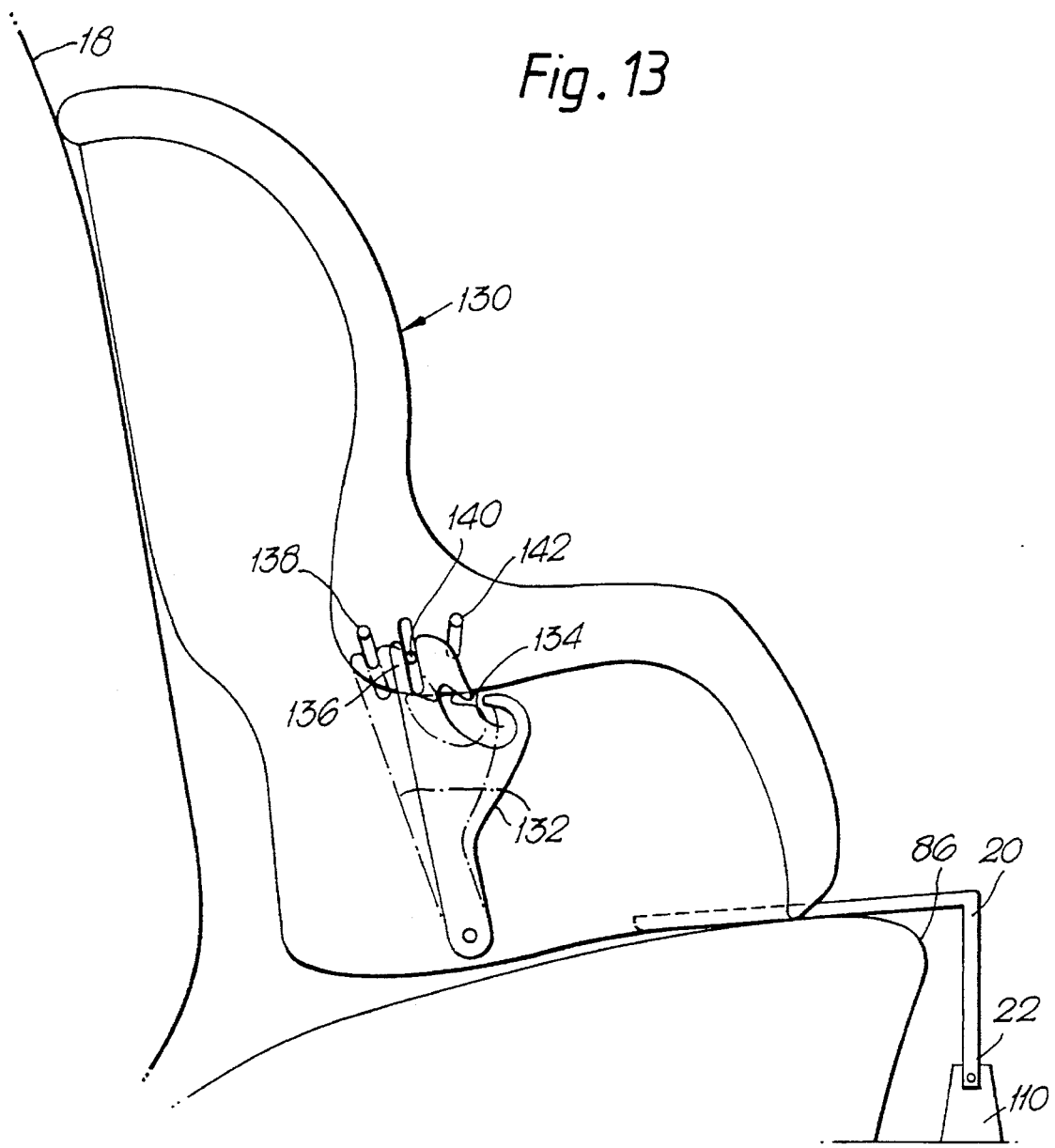

FIGS. 12 and 13 show a forward facing seat 130 in which the rear buckle links 30 of the seat shown in FIGS. 1 to 9 are replaced by buckle links 132 having integral belt guides 134. Other parts of the seat 120 shown in FIGS. 10 and 11 are denoted with the same reference numerals as corresponding parts of the seat 10 of FIGS. 1 to 9. The buckle links 132 are secured in their first positions (to engage with standard anchorage units 40) by respective screws 42 and the buckles 136 thereon have a similar mechanism to that shown in FIGS. 3 to 5.

When the seat 130 is to be secured using an adult seat belt (not shown), buckle links 132 are pivoted to the position shown in dotted lines in FIG. 13, where they are secured by engagement of respective first sliding catches 138 with the buckles 134. The adult seat belt is then pulled tight and fastened. Next, the buckle links 132 are pulled forwards until the buckles 134 are engaged by second sliding catches 140, thereby tensioning the adult seat belt. If necessary, adult seat belt can be tensioned further by pulling the buckle links 132 forwards until the buckles 134 are engaged by third sliding catches 142. Additional sliding catches may be provided if a greater range of adjustment is required. This also enables the belt guide to be positioned as required to cater for a variety of adult seat belt configurations, particularly adult buckle positions.

In any of the foregoing embodiments of the invention, the rear buckle links may be coupled so as to be movable between their first and second positions simultaneously.

In any of the foregoing embodiments of the invention, the seat body may consist of a seat portion, a base portion and means for reclining the seat portion relative to the base portion. The attachment buckles in accordance with the invention are secured to the base portion.

We claim:

1. A child safety seat for use in a vehicle, comprising a seat body having a seat portion and a backrest portion, and a pair of attachment buckles mounted by means of rigid links on opposite sides of the seat body for movement between a first position in which they project rearwardly so as to be engageable with two standard anchorage units on the vehicle which are accessible between a seat portion and a backrest portion of a seat of the vehicle and a second position in which they provide support for guide means for an adult seat belt, releasable means for securing each of the attachment buckles either in its first position or in its second position, and additional releasable means for holding the attachment buckles in an intermediate position in which the adult seat belt is fastened, subsequent movement of the attachment buckles into their second position being arranged to apply additional tension to the adult seat belt.

2. A child safety seat according to claim 1, further comprising a third attachment buckle mounted on a projection extending forwardly and downwardly from the seat body so as to be engageable, when the child safety seat is in the vehicle, with a third standard anchorage unit disposed adjacent to the front edge of the seat portion of the seat of the vehicle and below the top surface thereof even when a seat cushion of the seat of the vehicle is compressed to its maximum extent.

3. A child safety seat according to claim 1, wherein the guide means for the adult seat belt comprises a respective detachable guide unit adapted to be engaged by each attachment buckle.

4. A child safety seat according to claim 1, wherein each attachment buckle has integral guide means for the adult seat belt.

5. A child safety seat according to claim 4, further comprising a third attachment buckle mounted on a projection extending forwardly and downwardly from the seat body so as to be engageable, when the child safety seat is in the vehicle, with a third standard anchorage unit disposed adjacent to the front edge of the seat portion of the seat of the vehicle and below the top surface thereof even when a seat cushion of the seat of the vehicle is compressed to its maximum extent.

6. A child safety seat according to claim 1, wherein each rigid link is pivotally mounted on the seat body.

7. A child safety seat according to claim 6, wherein each attachment buckle has integral guide means for the adult seat belt.

8. A child safety seat according to claim 6, wherein each attachment buckle has guide means for the adult seat belt comprising a respective detachable guide unit adapted to be engaged thereby.

9. A child safety seat according to claims 6, further comprising a third attachment buckle mounted on a projection extending forwardly and downwardly from the seat body so as to be engageable, when the child safety seat is in the vehicle, with a third standard anchorage unit disposed adjacent to the front edge of the seat portion of the seat of the vehicle and below the top surface thereof even when a seat cushion of the seat of the vehicle is compressed to its maximum extent.

10. A child safety seat for use in a vehicle, comprising a seat body having a seat portion and a backrest portion, a pair of attachment buckles mounted by means of rigid links on opposite sides of the seat body for movement between a first position in which they project rearwardly so as to be engageable with two standard anchorage units on the vehicle which are accessible between a seat portion and a backrest portion of a seat of the vehicle and a second position in which they provide support for guide means for an adult seat belt, and a third attachment buckle mounted on a projection extending forwardly and downwardly from the seat body so as to be engageable, when the child safety seat is in the vehicle, with a third standard anchorage unit disposed adjacent to the front edge of the seat portion of the seat of the vehicle and below the top surface thereof even when a seat cushion of the seat of the vehicle is compressed to its maximum extent.

11. A child safety seat in combination with a vehicle having a vehicle seat and two standard anchorage units rigidly mounted on the vehicle so as to be accessible between a seat portion and a backrest portion of the vehicle seat, the child safety seat comprising:

a seat body having a seat portion and a backrest portion, and a pair of attachment buckles rigidly mounted by means of rigid links on opposite sides of the seat body for movement between a first position in which they project rearwardly so as to be engageable with said two standard anchorage units and a second position in which they provide support for guide means for an adult seat belt.

12. A child safety seat according to claim 11, wherein each rigid link is pivotally mounted on the seat body.

13. A child safety seat according to claim 11, wherein each attachment buckle has integral guide means for the adult seat belt.

14. A child safety seat according to claim 11, wherein each attachment buckle has guide means for the adult seat belt comprising a respective detachable guide unit adapted to be engaged thereby.

15. A child safety seat according to claim 11, further comprising a third attachment buckle mounted on a projection extending forwardly and downwardly from the seat body so as to be engageable, when the child safety seat is in the vehicle, with a third standard anchorage unit disposed adjacent to the front edge of the seat portion of the seat of the vehicle and below the top surface thereof even when a seat cushion of the seat of the vehicle is compressed to its maximum extent.

16. A child safety seat according to claim 11, further comprising releasable means for securing each of the attachment buckles either in its first position or in its second position.

17. A child safety seat according to claim 16, further comprising additional releasable means for holding the attachment buckles in an intermediate position in which the adult seat belt is to be fastened, subsequent movement of the attachment buckles into their second position being arranged to apply additional tension to the adult seat belt.

18. A child safety seat according to claim 17, further comprising a third attachment buckle mounted on a projection extending forwardly and downwardly from the seat body so as to be engageable, when the child safety seat is in the vehicle, with a third standard anchorage unit disposed adjacent to the front edge of the seat portion of the seat of the vehicle and below the top surface thereof even when a seat cushion of the seat of the vehicle is compressed to its maximum extent.

* * * * *

Disclaimer 5,487,588 - David W. Burleigh, Bognor Regis, England; Waldemar Czernakowski, Blaustein; Hermann Wetter, Ulm, both of Germany. CHILD SAFETY SEAT. Patent dated January 30, 1996. Disclaimer filed August 7, 1998, by the assignee, Britax-Excelsior Limited, England; Britax Romer Kindersicherheit GmbH, Germany.

Hereby enters this disclaimer to claims 1-18 of said patent.
*(Official Gazette, November 16, 1999)*